United States Patent
Lennox et al.

(10) Patent No.: US 7,373,931 B2
(45) Date of Patent: May 20, 2008

(54) METHOD AND APPARATUS FOR DELIVERING TWO FUELS TO A DIRECT INJECTION INTERNAL COMBUSTION ENGINE

(75) Inventors: Tim Lennox, Vancouver (CA); Adrian Post, Surrey (CA); Michael Wickstone, Richmond (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/669,155

(22) Filed: Jan. 30, 2007

(65) Prior Publication Data

US 2007/0199539 A1    Aug. 30, 2007

(30) Foreign Application Priority Data

Jan. 31, 2006    (CA)    .................................... 2532775

(51) Int. Cl.
    *F02M 21/02*    (2006.01)
    *F02B 3/00*    (2006.01)
(52) U.S. Cl. .................. 123/525; 123/27 GE; 123/527
(58) Field of Classification Search .................. 123/26, 123/27 GE, 525, 526, 527
    See application file for complete search history.

(56) References Cited

U.S. PATENT DOCUMENTS

| | | | | |
|---|---|---|---|---|
| 5,067,467 A | * | 11/1991 | Hill et al. .................... | 123/497 |
| 5,315,973 A | * | 5/1994 | Hill et al. .................... | 123/304 |
| 5,582,139 A | * | 12/1996 | Feuerman .................. | 123/25 C |
| 6,298,833 B1 | | 10/2001 | Douville et al. | |
| 6,761,325 B2 | | 7/2004 | Baker et al. | |
| 7,124,959 B2 | | 10/2006 | Baker et al. | |
| 2006/0081722 A1 | * | 4/2006 | Kato et al. .................... | 239/96 |

* cited by examiner

*Primary Examiner*—John T Kwon
(74) *Attorney, Agent, or Firm*—McAndrews, Held & Malloy, Ltd.

(57) ABSTRACT

An apparatus for delivering two fuels to a direct injection internal combustion engine comprises a liquid-fuel supply rail, a gaseous-fuel supply rail, a drain system with a shared drain rail for collecting both liquid fuel and gaseous fuel, and a venting device for venting gaseous fuel collected by the drain rail. The method comprises separately delivering a liquid fuel at injection pressure to an injection valve through a liquid-fuel rail, and actuating the liquid-fuel injection valve to introduce liquid fuel directly into the combustion chamber. The method further comprises delivering a gaseous fuel at injection pressure to an injection valve through a gaseous-fuel rail and actuating the gaseous-fuel injection valve to introduce gaseous fuel directly into the combustion chamber. The method further comprises collecting in a drain rail liquid fuel and gaseous fuel from the liquid-fuel injection valve and the gaseous-fuel injection valve, directing liquid fuel to a storage vessel, and directing gaseous fuel to a vent pipe.

39 Claims, 3 Drawing Sheets

METHOD AND APPARATUS FOR DELIVERING TWO FUELS TO A DIRECT INJECTION INTERNAL COMBUSTION ENGINE

FIELD OF THE INVENTION

The present invention relates to a method and apparatus for delivering two fuels to a direct injection internal combustion engine. More specifically, the invention relates to a fuel system that keeps the two fuels separate until they are separately and independently introduced directly into the engine's combustion chamber and a drain system for draining both fuels from the fuel system.

BACKGROUND OF THE INVENTION

Engines that burn diesel fuel are the most popular type of compression ignition engines. So-called diesel engines introduce fuel at high pressure directly into the combustion chamber. Diesel engines are very efficient because this allows high compression ratios to be employed without the danger of knocking, which is the premature detonation of the fuel mixture inside the combustion chamber. Because diesel engines introduce their fuel directly into the combustion chamber, the fuel injection pressure must be greater than the pressure inside the combustion chamber when the fuel is being introduced, and, for liquid fuels the pressure must be significantly higher so that the fuel is atomized for efficient combustion.

Diesel engines are favored by industry because they are proven performers that are known to give operators the best combination of power, performance, efficiency and reliability. For example, diesel engines are generally much less expensive to operate compared to gasoline fueled spark-ignited engines, especially in high-use applications where a lot of fuel is consumed. However, a disadvantage of diesel engines is that they can produce more pollution, such as particulate matter (soot) and NOx, which are subject to increasingly stringent regulations that require such emissions to be progressively reduced over time. To comply with such regulations, engine manufacturers are developing catalytic converters and other aftertreatment devices to remove pollutants from the exhaust stream. Improvements to the fuel are also being introduced, for example to reduce the amount of sulfur in the fuel, to prevent sulfur from de-activating catalysts and to reduce air pollution. Research is being conducted to improve combustion efficiency to reduce engine emissions, for example by making refinements to engine control strategies. However, most of these approaches add to the capital cost of the engine and/or the operating costs.

Recent developments have been directed to substituting some of the diesel fuel with cleaner burning gaseous fuels such as, for example, natural gas, pure methane, butane, propane, hydrogen, and blends thereof. However, in this disclosure "gaseous fuel" is defined more broadly than these examples, as any combustible fuel that is in the gaseous phase at atmospheric pressure and ambient temperature. Since gaseous fuels typically do not auto-ignite at the same temperature and pressure as diesel fuel, a small amount of liquid fuel can be introduced into the combustion chamber to auto-ignite and trigger the ignition of the gaseous fuel. One approach for consuming gaseous fuel on board a vehicle involves introducing the gaseous fuel into the engine's intake air manifold at relatively low pressures. However, with this approach, engines have been unable to match the performance and efficiency of diesel engines. In a preferred method, it is possible to substantially match the performance and efficiency of a conventional diesel engine by delivering a high-pressure gaseous fuel to an engine for injection directly into the combustion chamber.

A problem with delivering two different fuels for injection directly into the combustion chambers of an internal combustion engine, is that it can be difficult to find the physical space for two fuel injection valves per cylinder and space near the fuel injection valves to provide two high pressure fuel rails in addition to drain lines for taking away fuel that may leak from the fuel injection valves and fluid that is drained from control chambers of hydraulically actuated fuel injection valves.

High-pressure liquid fuel that leaks from a conventional diesel fuel injection valve is normally collected and directed to a drain rail that returns the fuel back to a fuel tank. Such a drain can also be employed to collect diesel fuel that is drained from a control chamber of a hydraulic actuator for the valve needle, when the diesel fuel is also employed as a hydraulic fluid for actuating the fuel injection valve. In a conventional diesel engine, the low-pressure drain rail adds to the piping around the fuel injection valves, but this is manageable with only one fuel. With an engine that is fueled with a liquid fuel and a gaseous fuel, there is a need to drain liquid fuel and vent high-pressure gaseous fuel that leaks from the gaseous fuel injection valve. If gaseous fuel leaks from a gaseous-fuel injection valve and is not collected and somehow vented, the high-pressure gaseous fuel can collect between the fuel injection valve body and the cylinder head, exerting forces on the fuel injection valve that can act against the clamps that are typically employed to hold the fuel injection valve in position. For a common rail direct injection fuel system, the gaseous fuel can be delivered to the fuel injection valve at a pressure of at least 20 MPa (about 3000 psi), and depending upon the engine characteristics, such as its compression ratio, for some engines the desired fuel injection pressure can be even higher. Accordingly, there is a need to provide for a means for venting any gaseous fuel that leaks from the fuel injection valve without adding to the complexity of the piping to and from the fuel injection valves.

SUMMARY OF THE INVENTION

An apparatus separately delivers a liquid fuel and a gaseous fuel into a combustion chamber of an internal combustion engine. The apparatus comprises a liquid-fuel supply system, a gaseous-fuel supply system and a drain system. The liquid-fuel supply system comprises a liquid-fuel storage vessel that is fillable with the liquid fuel; a liquid-fuel pump with a liquid-fuel inlet fluidly connected by a liquid-fuel passage to the liquid-fuel storage vessel; and a liquid-fuel rail fluidly connected to an outlet of the liquid-fuel pump and to a liquid-fuel accumulator chamber inside at least one liquid-fuel injection valve that is operable to introduce the liquid fuel from the liquid-fuel accumulator chamber through a first nozzle directly into the combustion chamber. The gaseous-fuel supply system comprises a gaseous-fuel supply pipe; a gaseous-fuel pressurizing device with a gaseous-fuel inlet fluidly connected by a gaseous-fuel passage to the gaseous-fuel supply pipe; and a gaseous-fuel rail fluidly connected to an outlet of the gaseous-fuel pressurizing device and to a gaseous-fuel accumulator chamber inside at least one gaseous-fuel injection valve that is operable to introduce the gaseous fuel from the gaseous-fuel accumulator chamber through a second nozzle directly into the combustion chamber. The drain system comprises a drain rail with a receiving end fluidly connected to at least one drain passage from the liquid-fuel injection valve and at least one drain passage from the gaseous-fuel injection valve, and a discharge end fluidly connected to the liquid-fuel storage vessel; a venting device through which gaseous fuel can be vented from the drain rail or the liquid-fuel storage vessel.

In a preferred embodiment of the apparatus, the gaseous-fuel injection valve comprises a body with a drain passage with an opening to the outside of the body to recover gaseous fuel that leaks from the body and to direct the gaseous fuel through the drain passage to the drain rail.

The gaseous-fuel supply system can comprise a gaseous-fuel storage vessel that communicates with the gaseous-fuel supply pipe and that is fillable with the gaseous fuel or the gaseous-fuel supply pipe can be connected to a pipeline distribution network. If a gaseous-fuel storage vessel is part of the gaseous-fuel supply system, the gaseous-fuel storage vessel can be a thermally insulated vessel in which a liquefied gaseous fuel can be stored at cryogenic temperatures, and the gaseous-fuel pressurizing device is a pump for pumping the liquefied gaseous fuel at cryogenic temperatures. The gaseous-fuel supply system can further comprise a heat exchanger disposed between the pump and the gaseous-fuel rail for heating the gaseous fuel after it is discharged from the pump.

An advantage of storing a gaseous fuel in liquefied form at a cryogenic temperature is that a much higher energy density can be achieved compared to the same gaseous fuel stored at high pressure in the gaseous phase. However, if the gaseous-fuel supply system is for a vehicle with only short range routes and/or where high-pressure gaseous fuel is readily available for re-fueling, it is possible to use a gaseous-fuel storage vessel that is a pressure vessel in which the gaseous fuel can be stored under pressure and in such embodiments the gaseous-fuel pressurizing device can be a compressor. In some markets this can be a preferred approach if there is greater familiarity with handling high pressure gases, versus cryogenic fluids, and where there is an established re-filling network for gaseous fuels. When a compressor is employed to pressurize the gaseous fuel the gaseous-fuel supply system can further comprise a heat exchanger disposed between the compressor and the gaseous-fuel rail for cooling the gaseous fuel after it is discharged from the compressor.

In preferred embodiments, a portion of the liquid-fuel rail comprises a bore disposed within a cylinder head of the internal combustion engine. An advantage of having the liquid-fuel rail disposed within the cylinder head comprising either a bore in the cylinder head or pipes disposed in opening provided in the cylinder head is that it simplifies the arrangement above the cylinder head which includes ignition devices such as spark plugs or glow plugs, actuators for the fuel injection valves and actuators for the engine intake and exhaust valves. In a preferred embodiment the engine has a plurality of cylinder heads with each one of the plurality of cylinder heads being associated with a plurality of in-line cylinders and the liquid-fuel rail comprises a bore through one of the plurality of cylinder heads for delivering the liquid fuel to a plurality of liquid-fuel injection valves that are associated with the at least one of the plurality of cylinder heads.

In addition to a portion of the liquid-fuel rail being disposed within the cylinder head, similar advantages can be realized if a portion of the gaseous-fuel rail and/or the drain rail comprises a bore disposed with the cylinder head. That is, in a preferred embodiment, portions of each one of the liquid-fuel rail, the gaseous-fuel rail, and the drain rail all comprise respective bores disposed within the cylinder head.

In preferred embodiments, the venting device for venting gaseous fuel from the drain rail or the liquid-fuel storage vessel comprises a pressure relief valve. If associated with the liquid-fuel storage vessel, the pressure relief valve can be mounted to vent gas from a vapor space of the liquid-fuel storage vessel. Instead of a pressure relief valve, the venting device can be a roll-over vent valve mounted on top of the liquid-fuel storage vessel. The roll-over vent valve can comprise a valve member that is actuated by gravity. The venting device can further comprise a vent pipe connecting the venting device to a holding tank or to the gaseous-fuel supply pipe for re-introduction into the gaseous-fuel supply system.

The venting device can further comprise a gas-liquid separator disposed in a drain pipe that connects the drain rail to the liquid-fuel storage vessel. In this embodiment the gas-liquid separator has a liquid outlet communicating with the liquid-fuel storage vessel and a gas outlet communicating with a vent pipe.

In preferred embodiments, the liquid-fuel injection valve and the gaseous-fuel injection valve are housed within one valve body. That is, the liquid-fuel injection valve and the gaseous-fuel injection valve are integrated within one valve assembly that can be installed in one opening in the cylinder head. The liquid-fuel injection valve and the gaseous-fuel injection valve can be co-axial with the liquid-fuel injection valve at the centre and the gaseous-fuel injection valve disposed in an annular space around the liquid-fuel injection valve. In this embodiment the liquid-fuel injection valve comprises a nozzle that is movable to function as the needle for the gaseous-fuel injection valve. The liquid-fuel injection valve and the gaseous-fuel injection valve are preferably independently operable so that the gaseous-fuel can be injected independently from the liquid fuel and the respective timing for the liquid and gaseous fuel injection events is also independent.

The liquid-fuel injection valve can comprise a valve needle that is spring biased and hydraulically actuated by manipulating hydraulic fluid pressure within a first control chamber between two pressures. The first control chamber can be fluidly connectable by fluid passages with the drain rail and the liquid-fuel rail, and a control valve associated with at least one of the fluid passages, is operable to switch hydraulic fluid pressure between liquid-fuel rail pressure and drain rail pressure. Similarly, the gaseous-fuel injection valve can comprise a valve needle that is spring biased and hydraulically actuated by manipulating hydraulic fluid pressure within a second control chamber between two pressures. The second control chamber can be likewise fluidly connectable by fluid passages with the drain rail and the liquid-fuel rail, and a control valve associated with at least one of the fluid passages, is operable to switch hydraulic fluid pressure between liquid-fuel rail pressure and drain rail pressure.

A method separately delivers a liquid fuel and a gaseous fuel into a combustion chamber of an internal combustion engine. The method comprises supplying a liquid fuel from a liquid-fuel storage vessel, pumping the liquid fuel and delivering the liquid fuel at injection pressure from the liquid-fuel storage vessel to a liquid-fuel injection valve through a liquid-fuel rail, and actuating the liquid-fuel injection valve to introduce the liquid fuel directly into the combustion chamber. The method further comprises supplying a gaseous fuel from a gaseous-fuel supply pipe, pressurizing the gaseous fuel, delivering the gaseous fuel at injection pressure from the gaseous-fuel supply pipe to a gaseous-fuel injection valve through a gaseous-fuel rail, and actuating the gaseous-fuel injection valve to introduce the gaseous fuel directly into the combustion chamber. In addition, the method comprises collecting in a drain rail, liquid fuel and gaseous fuel from the liquid-fuel injection valve and the gaseous-fuel injection valve respectively, and directing liquid fuel from the drain rail to the liquid-fuel storage vessel, and directing gaseous fuel from the drain rail to a vent pipe.

According to the method, gaseous fuel can be supplied to the gaseous-fuel supply pipe from a distribution pipe, or in preferred embodiments, the method can further comprise supplying the gaseous fuel to the gaseous-fuel supply pipe from a gaseous-fuel storage vessel.

The method can further comprise venting gaseous fuel through the vent pipe when gas pressure exceeds a predetermined set point. In addition, the method can further comprise directing the gaseous fuel from the vent pipe to a holding tank or to the gaseous fuel supply pipe.

In preferred methods pressure within the liquid-fuel storage vessel is maintained at or near atmospheric pressure by connecting the vent pipe to the liquid-fuel storage vessel. The method can further comprise preventing liquid fuel from escaping through the vent line by blocking fluid flow through the vent pipe if the liquid-fuel storage vessel tips onto its side or up-side-down.

Like in the preferred apparatus, a preferred method comprises directing at least one of the liquid fuel and the gaseous fuel through a bore in a cylinder head of the engine that is at least a portion of a respective one of the liquid-fuel rail, the gaseous-fuel rail, and the drain rail. More preferably, each one of the liquid-fuel rail, the gaseous-fuel rail, and the drain rail comprises at least a portion that is a bore provided within a cylinder head of the engine.

Preferred methods comprise hydraulically actuating at least one of the liquid-fuel injection valve and the gaseous-fuel injection valve by controlling liquid-fuel pressure in a control chamber associated with a plunger that is associated with a fuel injection valve needle.

Preferred methods further comprise supplying high pressure liquid fuel to the control chamber from the liquid-fuel rail, draining liquid fuel from the control chamber to the drain rail, and operating a control valve to switch liquid-fuel pressure inside the control chamber between liquid-fuel rail pressure and drain rail pressure, wherein drain rail pressure is lower than liquid-fuel rail pressure.

An objective of the present technique is to reduce air pollution by substituting cleaner burning gaseous fuels instead of conventional liquid fuels like diesel, for most of the fuel that is consumed by the engine. Accordingly, the liquid fuel that is delivered to the engine constitutes only a small quantity of fuel that is employed as a pilot fuel to ensure ignition of the gaseous fuel. The liquid fuel can be conventional diesel fuel, or other liquid fuels such as kerosene, biodiesel, or dimethylether, that will auto-ignite in a compression ignition engine. By way of example, the liquid fuel can be, on average, less than 10% of the total fuel consumed by the engine.

There can also be economic advantages associated with substituting a gaseous fuel for diesel fuel, since in many markets around the world, gaseous fuels are less expensive than diesel fuel on an energy basis, and if the gaseous fuels can be consumed in an engine with the same efficiencies as diesel fuels, this can result in a significant savings in the operating costs for the engine. In addition, geographically, compared to oil, natural gas as a resource is more broadly available, with many more countries having larger natural gas reserves than oil reserves, providing a potentially more secure supply of fuel.

DETAILED DESCRIPTION OF PREFERRED EMBODIMENT(S)

Figure 1:
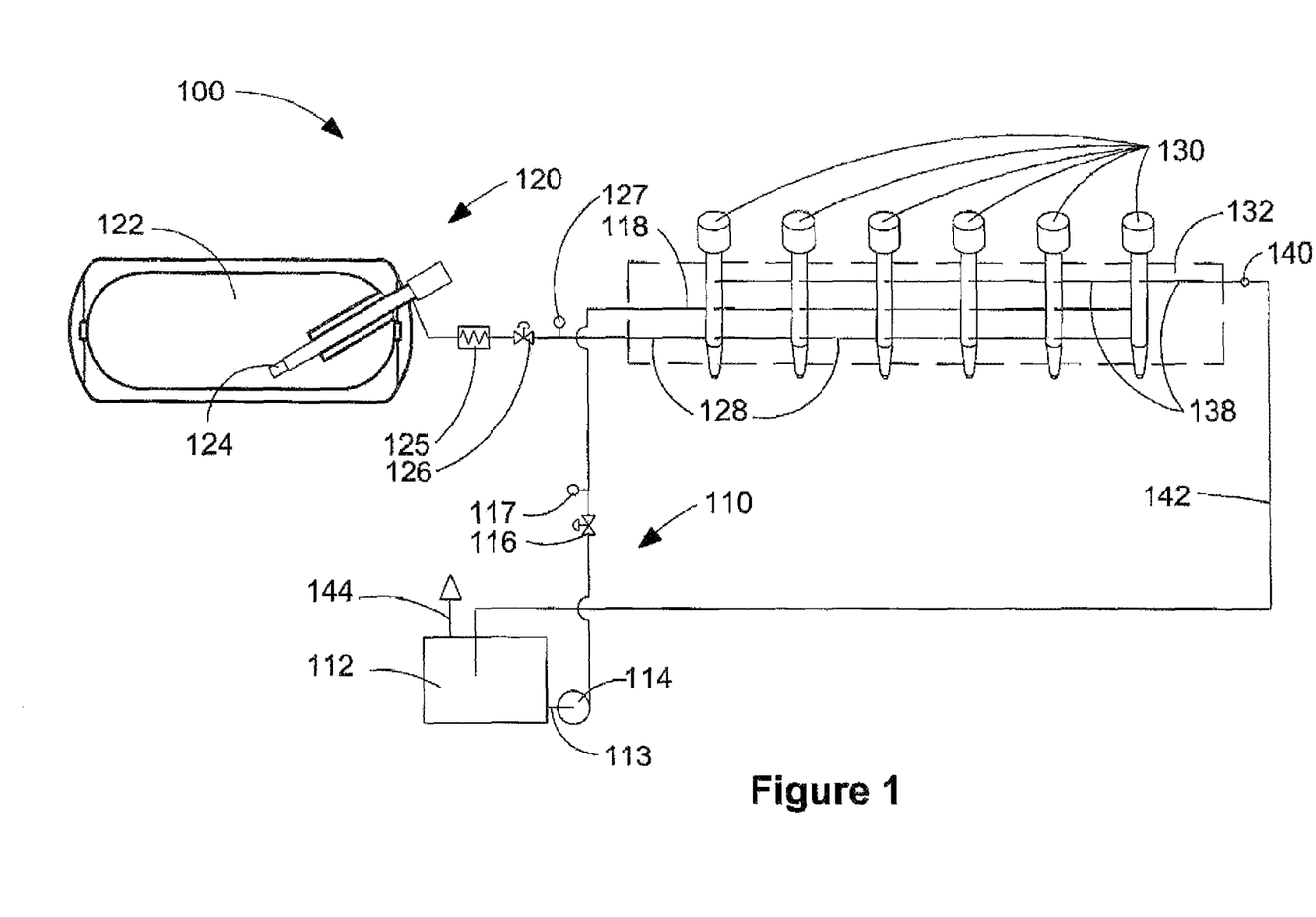
FIG. 1 is a schematic diagram of an apparatus for delivering a liquid fuel and a gaseous fuel into a combustion chamber of an internal combustion engine. The apparatus comprises: a liquid-fuel supply system comprising a liquid-fuel storage vessel, a liquid-fuel pump, a liquid-fuel rail, and a liquid-fuel injection valve; a gaseous-fuel supply system comprising a gaseous-fuel cryogenic storage vessel for storing a liquefied gaseous fuel, a pump for pumping liquefied gaseous fuel, a gaseous-fuel rail, and a gaseous fuel injection valve; and a drain rail for returning low pressure liquid fuel and vented gaseous fuel to the liquid-fuel storage vessel.

FIG. 1 is a schematic view of apparatus 100, which delivers a liquid fuel and a gaseous fuel into a combustion chamber of an internal combustion engine. Apparatus 100 comprises liquid-fuel supply system 110, which itself comprises liquid-fuel storage vessel 112, suction line 113, liquid-fuel pump 114, pressure control valve 116, optional pressure sensor 117, and liquid-fuel rail 118. Apparatus 100 further comprises gaseous-fuel supply system 120, which itself comprises gaseous-fuel storage vessel 122, gaseous-fuel pump 124, heat exchanger 125, pressure control valve 126, optional pressure sensor 127, and gaseous-fuel rail 128. Optional pressure sensors 117 and 127 can be employed to respectively monitor liquid and gaseous fuel pressure to ensure that liquid-fuel supply system 110 and gaseous-fuel supply system 120 are functioning normally.

The engine comprises a plurality of fuel injection valves 130, which are mounted in cylinder head 132. In FIG. 1, cylinder head 132 is schematically shown in dashed outline. In the illustrated embodiment the engine can have a cylinder block with six in-line cylinders (not shown), with one fuel injection valve associated with the combustion chamber defined by each cylinder. In the illustrated embodiments, each fuel injection valve 130 is capable injecting the liquid fuel and the gaseous fuel into a respective combustion chamber (not shown), so each fuel injection valve 130 is associated with liquid-fuel rail 118 and gaseous-fuel rail 128. Even though the liquid-fuel injection valve and the gaseous-fuel injection valve are integrated into a single dual fuel injection valve, the liquid-fuel injection valve and the gaseous-fuel injection valve are preferably independently operable to separately introduce the liquid fuel and gaseous fuel into the combustion chambers. This allows separate timing for the liquid fuel and gaseous fuel injection events and more precise control over the quantity of each fuel that is injected into the combustion chambers.

Persons familiar with the technology involved here will understand that the disclosed apparatus and method can be applied to internal combustion engines of different sizes and with any number of cylinders. For engines with more than one cylinder head, fuel supply and drain rails can have branches associated with each cylinder head.

Figure 3:
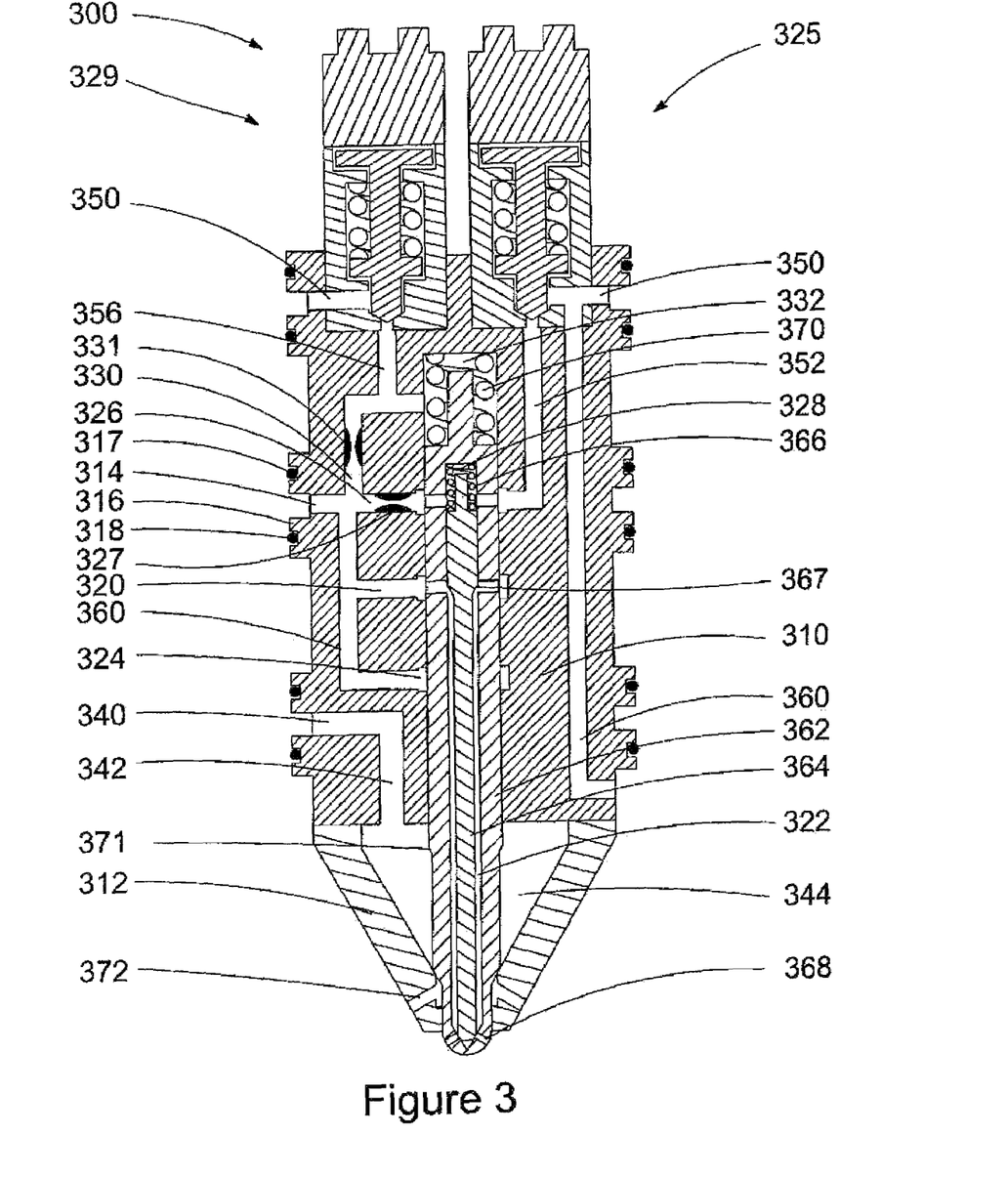
FIG. 3 is a schematic view of a fuel injection valve that has co-axial liquid-fuel and gaseous-fuel injection valves, and side ports for communicating with fuel supply rails and drain rails that can be routed through the engine's cylinder head.

Drain rail 138 collects liquid fuel and/or gaseous fuel from drain passages provided internal to fuel injection valves 130 (as shown in FIG. 3). Fuel in drain rail 138 is at a lower pressure than that of the fuels in fuel supply rails 118 and 128. Valve 140 ensures that a predetermined minimum back-pressure is maintained during normal operation to prevent cavitation inside the internal passages of fuel injection valves 130. Valve 140 can be a one-way check valve to ensure that fluid only flows in one direction from drain rail 138 to drain pipe 142. Fluid flows through drain pipe 142 to liquid-fuel storage vessel 112. Liquid-fuel storage vessel 112 is equipped with vent 144 so that the fuel can be stored at or near atmospheric pressure. Vent 144 can be a simple open vent tube, but preferably vent 144 further comprises a valve. For example, the valve can be a pressure relief valve or a roll-over valve that has a gravity actuated valve member that closes if the liquid-fuel storage vessel is rolled onto its side or inverted (to prevent fuel spillage from a vehicle fuel tank if the vehicle rolls over). If the vent pipe is a simple open vent tube or a vent tube with a gravity-actuated roll-over valve, the liquid fuel is stored at atmospheric pressure. If a pressure relief valve is employed, vapor pressure in the liquid-fuel storage vessel can increase until it is just below the predetermined set point that is the relief pressure, which is preferably near atmospheric. To comply with local regulations, the set point for the relief pressure is at least the requisite factor of safety below the burst pressure of the liquid-fuel storage vessel.

Vent 144 can also be connected to a holding tank for storing gaseous fuel instead of venting it to atmosphere. In another embodiment (not shown) a gas-liquid separator can be disposed in drain pipe 142 between drain rail 132 and liquid-fuel storage vessel 112, to separate the collected gaseous fuel from drain pipe 142 before it reaches liquid-fuel storage vessel 112.

The amount of liquid fuel that flows to drain can be much more than the amount of gaseous fuel that flows to drain, because in addition to small amounts of fuel that may leak from the integrated fuel injection valve assembly, in a preferred embodiment the liquid fuel can also be employed as the hydraulic fluid for actuating the liquid-fuel injection valve needle and/or the gaseous-fuel injection valve needle. Hydraulically actuated fuel injection valves are well known. By controlling hydraulic fluid pressure in a control chamber to switch hydraulic fluid pressure from high-pressure to drain pressure, and vice versa, a fuel injection valve needle can be actuated between open and closed positions under the influence of fuel pressure and/or springs that also exert forces that act on the valve needle. When liquid fuel, serving as hydraulic actuation fluid, is drained from a control chamber for actuating the associated valve needle, the liquid fuel from the control chamber can be drained through drain rail 138.

In another embodiment, not shown, the liquid-fuel injection valve can be separate from the gaseous-fuel injection valve. However, such an embodiment is less preferred for a number of reasons. For example, separate liquid-fuel and gaseous-fuel injection valves complicate the arrangement of drain rail 138, which in accordance with the presently disclosed invention is connected to drain passages from both the liquid-fuel injection valve and the gaseous-fuel injection valve. Separate liquid-fuel and gaseous-fuel injection valves also complicate the supply of high pressure hydraulic fluid if the liquid-fuel and gaseous-fuel injection valves are both hydraulically actuated. A further disadvantage of separate liquid-fuel and gaseous-fuel injection valves is that more space in the cylinder head is required to mount two injection valves per cylinder instead of one, whereas one integrated dual fuel injection valve can be made to fit in the same location as a conventional diesel-only fuel injection valve, reducing the modifications needed to convert a conventional diesel engine into an engine that substitutes a gaseous fuel for most of the diesel fuel.

The method of operating apparatus 100 is described as follows. Fuel injection valves 130 are preferably so-called common rail injection valves. That is, the fuel is supplied at injection pressure to each one of fuel injection valves 130 through the same fuel rail. Persons familiar with the technology involved here will understand that the term "rail" as it is defined herein means a conduit, bore, or pipe that functions as a manifold for distributing fuel to the fuel injection valves. Accordingly, when the engine is running, liquid-fuel rail 118 and gaseous-fuel rail 128 are each filled with a pressurized fuel at injection pressure, and fuel can be injected by actuating a respective valve needle from a closed position to an open position. The term "rail" can also be used to describe a drain manifold, such as drain rail 138, which communicates with a drain port of each one of the fuel injection valves for collecting fluid from drain passages provided within the fuel injection valves.

Liquid fuel in liquid-fuel rail 118 is maintained at the desired injection pressure by operating pump 114 and by operation of pressure control valve 116, which is disposed in the liquid-fuel delivery pipe between pump 114 and liquid-fuel rail 118. Pressure control valve 116 can be set to control liquid-fuel pressure in liquid-fuel rail 118 so that it is maintained at a predetermined fixed pressure when the engine is running. In other embodiments, pressure control valve 116 can be controlled by an electronic controller to regulate liquid-fuel pressure within liquid-fuel rail 118 responsive to engine operating conditions, for example to adjust pressure within liquid-fuel rail 118 to predetermined pressures defined by an engine map.

In the schematic illustration of FIG. 1, the fuel rails are shown extending through the six fuel injection valves 130, and in the physical arrangement passages can be provided around the fuel injection valves in annular recesses provided in cylinder head 132 around fuel injection valves 130 or by annular passages provided between land areas protruding from the surface of fuel injection valves 130.

Gaseous fuel in gaseous-fuel rail 128 is maintained at the desired injection pressure by operating pump 124 and by operation of pressure control valve 126, which is located in the gaseous-fuel delivery pipe between heat exchanger 125 and gaseous-fuel rail 128. When the liquid-fuel injection valve and the gaseous-fuel injection valve are integrated into a dual fuel injection valve assembly, to reduce pressure differentials between the two high-pressure fuels, gaseous-fuel injection pressure is preferably set to be equal or slightly less than the liquid-fuel injection pressure, so that gaseous fuel does not leak into the liquid-fuel passages. An apparatus and method of dynamically controlling liquid-fuel and gaseous-fuel pressures in an integrated liquid-fuel and gaseous-fuel injection valve is disclosed in co-owned U.S. Pat. No. 6,298,833. Accordingly, the operation of pressure control valve 126 is preferably linked to the operation of pressure control valve 116, or one pressure control valve can be employed to maintain a pressure differential between the pressure in liquid-fuel rail 118 and the pressure in gaseous-fuel rail 128.

Like liquid-fuel rail 118, in the schematic illustration of FIG. 1, gaseous-fuel rail 128 is shown extending through the six fuel injection valves 130, and in the physical arrangement passages can be provided around the fuel injection valves in annular recesses provided in cylinder head 132 around fuel injection valves 130 or by annular passages provided between land areas protruding from the surface of fuel injection valves 130.

Gaseous-fuel storage vessel 122 can be a double-walled vacuum insulated vessel for storing a liquefied gaseous fuel at cryogenic temperatures and relatively low pressures. Pump 124 is immersed in the liquefied gas and in preferred embodiments is a reciprocating piston pump. The pump drive is located outside of gaseous-fuel storage vessel 122 and connected by an elongated shaft, the length of which helps to reduce heat leak into the cryogen space defined by gaseous-fuel storage vessel 122, and freezing of the drive unit. For actuating pump 124 at the desired speeds, the drive unit is preferably a hydraulic motor with a reciprocating piston.

Figure 2:
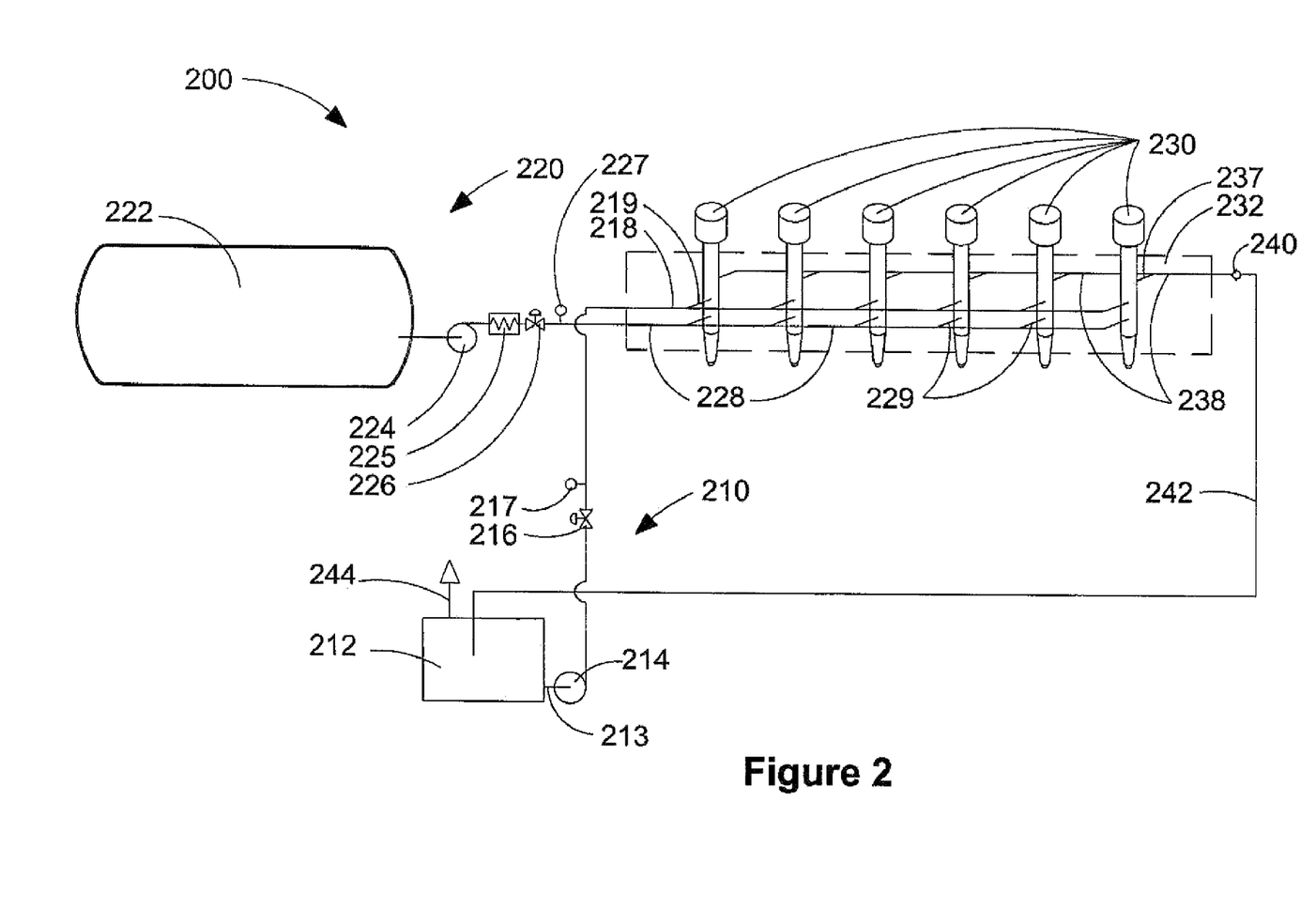
FIG. 2 is a schematic diagram of an apparatus for delivering a liquid fuel and a gaseous fuel into a combustion chamber of an internal combustion engine. The apparatus of FIG. 2 is similar to that of FIG. 1 with a few exceptions such as the gaseous fuel being stored in the gaseous phase and pressurized by a compressor instead of a pump.

FIG. 2 is a schematic view of apparatus 200 which is another preferred embodiment for delivering a liquid fuel and a gaseous fuel to a direct injection internal combustion engine. Like-illustrated components with like reference numbers separated by multiples of one hundred refer to like components unless otherwise noted. For example, liquid-fuel supply system 210 is essentially the same as liquid-fuel supply system 110 that is shown in FIG. 1. Liquid fuel is stored in liquid-fuel storage vessel 212 and liquid fuel flows through suction pipe 213 to pump 214, which is operable to supply liquid fuel and maintain the desired pressure in liquid-fuel rail 218. Liquid-fuel pressure control valve 216 which is disposed in the liquid-fuel supply pipe between pump 214 and liquid-fuel rail 218 is operable to regulate liquid-fuel pressure in liquid-fuel rail 218. Optional pressure sensor 217 can be employed to monitor pressure in liquid-fuel rail 218 to make sure that liquid-fuel supply system 210 is functioning normally. In this embodiment liquid-fuel rail 218 is shown having a plurality of branches 219 with branches 219 connecting liquid-fuel rail 218 to each one of fuel injection valves 230. Branches 219, which are shown schematically in FIG. 2 can be a bore in the cylinder head or if liquid-fuel rail 218 is a pipe, branches 219 can be pipes that connect to fuel injection valves 230 above the cylinder head or through an opening provided in the cylinder head.

The main difference between the embodiment of FIG. 2 and that of FIG. 1 relates to how the gaseous fuel is stored. In the embodiment of FIG. 2, the gaseous fuel is stored in gaseous-fuel storage vessel 222 in the gaseous phase at relatively high pressures (not liquefied and at a cryogenic temperature as in the embodiment illustrated by FIG. 1). Accordingly, gaseous-fuel storage vessel 222 is a so-called "pressure vessel" that is rated for storing a gaseous fuel at pressures at least as high as about 25 MPa (about 3600 psi). Since the gaseous fuel is stored in the gaseous phase, to pressurize the gaseous fuel, compressor 224 is employed instead of a cryogenic pump. In FIG. 1, heat exchanger 125 is used to heat the gaseous fuel since it is stored at a cryogenic temperature, whereas in FIG. 2, heat exchanger 225 can be employed to cool the gaseous fuel after it has been compressed. Gaseous-fuel compressor 224 is shown schematically in FIG. 2, but in a preferred embodiment compressor 224 can be one or a plurality of reciprocating piston compressors. Like in the embodiment of FIG. 1, gaseous-fuel supply system 220 comprises pressure control valve 226 and can optionally comprise pressure sensor 227, disposed in the gaseous-fuel supply pipe between heat exchanger 225 and gaseous-fuel rail 228. Like liquid-fuel rail 218, gaseous-fuel rail 228 is shown having branches 229 that connect gaseous-fuel rail 228 to respective ones of fuel injection valves 230.

Like the embodiment of FIG. 1, in the embodiment of FIG. 2 a plurality of fuel injection valves are mounted in cylinder head 232 above the engine's combustion chambers for injecting the liquid and gaseous fuels separately, independently, and directly into the combustion chambers. In FIG. 2, drain rail 238, valve 240, drain pipe 242 and vent 244 are like drain rail 138, valve 140, drain pipe 142 and vent 144 in FIG. 1. Like the fuel rails in the embodiment shown by FIG. 2, drain rail 238 is connected to respective drain ports of fuel injection valves 230 by branches 237.

While not shown in FIG. 1 or FIG. 2, gaseous-fuel supply system 120, 220 can further comprise an accumulator vessel upstream of pressure regulator 126, 226. If the volume defined by the gaseous-fuel supply pipe and gaseous-fuel rail 128 is small, an accumulator vessel can be employed to facilitate maintaining the desired gaseous-fuel pressure by ensuring that an adequate supply of high-pressure gaseous fuel is always available.

In yet another embodiment, not illustrated, instead of a gaseous-fuel storage vessel, gaseous fuel can be supplied from a pipeline distribution network. For example, such a system could be employed for an engine that is used for stationary power generation. The supply pressure for gaseous fuel delivered from a pipeline is typically lower than the pressure of gaseous fuel that can be stored in a pressure vessel. Accordingly, when the gaseous fuel is supplied from a pipeline the gaseous fuel supply system can comprise a multi-stage compressor for pressurizing the gaseous fuel to the requisite pressure for direct injection into the engine's combustion chamber.

FIG. 3 is a schematic section view of fuel injection valve assembly 300, showing co-axial liquid-fuel and gaseous-fuel injection valves that are integrated into assembly 300. The liquid-fuel injection valve is at the center and the gaseous-fuel injection valve is disposed in the annular space that surrounds the liquid-fuel injection valve. In this schematic illustration, valve body 310 is shown as one piece but for manufacturability, valve body 310 can comprise a plurality of pieces. In addition, all of the fluid passages are not normally all provided within one plane, but for illustrative purposes, all of the fluid passages are shown schematically in FIG. 3 in the plane shown by one section view of fuel injection valve assembly 300. Nozzle 312 is shown as a separate piece, with a flat contact face seal between valve body 310 and nozzle 312. If valve body 310 and nozzle 312 are both made of metal, then the contact face seal is a metal-to-metal face seal. Nozzle 312 can be made from a metal or ceramic material that is compatible with exposure to combustion chamber temperatures. What is important is that the contact face seal preferably does not employ a gasket or resilient seal between valve body 310 and nozzle 312. Valve body 310 need not be made from the same material as nozzle 312. For example, nozzle 312 can be made from M50 tool steel and valve body 310 can be made from M2 tool steel. Valve body 310 is provided with fluid openings at three different levels, for fluidly connecting with two high-pressure fuel rails and one drain rail.

High-pressure liquid fuel is introduced into valve body 310 from a liquid-fuel rail through inlet 314, which is disposed in a recess of annular land 316, which also defines annular grooves for receiving annular ring seals 317 and 318, which can be resilient o-rings. Liquid fuel can flow through inlet 314 through passage 320 to liquid-fuel accumulator chamber 322. A branch passage from passage 320 can also be provided to direct liquid fuel to a fluid seal 324, which is an annular cavity that provides a seal between valve body 310 and liquid-fuel valve body 362. While a match fit can be used to reduce the size of the gap and thereby reduce leakage between valve body 310 and liquid-fuel valve body 362, in the illustrated embodiment a dynamic seal such as fluid seal 324 is desirable between valve body 310 and liquid-fuel valve body 362 since liquid-fuel valve body 362 is moveable with respect to valve body 310 to operate as the valve needle for the gaseous-fuel injection valve.

In the illustrated embodiment of FIG. 3, the liquid-fuel and gaseous-fuel injection valves are both hydraulically actuated. That is, hydraulic fluid pressure in a control chamber is manipulated by operation of a control valve to open and close the fuel injection valves. While an arrangement is shown that employs orifices in the supply passages and two-way control valves in the drain passages to regulate hydraulic fluid pressure, other embodiments are well known, and equally applicable, such as three-way control valves to alternatively connect the control chambers to pressure and drain hydraulic fluid passages. In the illustrated embodiment, high-pressure liquid fuel supplied from the liquid-fuel rail is employed as the hydraulic fluid.

When control valve 325 is closed, as it is shown in FIG. 3, hydraulic fluid (liquid fuel) is prevented from draining to drain outlet 350 through drain passage 353 so that control chamber 328 is filled with hydraulic fluid at liquid-fuel rail pressure, which exerts a force on liquid-fuel valve needle 364 to hold it in a closed position against a valve seat in the nozzle tip. Spring 366 also acts on liquid-fuel valve needle 364 to bias it in the closed position even if there is a drop in liquid fuel pressure, such as when the engine is shut down. When control valve 325 is actuated to lift its needle away from its seat, because flow of hydraulic fluid into control chamber 328 is restricted by orifice 327, hydraulic fluid drains from control chamber 328 through drain passage 352 faster than it can be replaced. As a consequence, hydraulic fluid pressure in control chamber 328 drops to drain rail pressure, and liquid-fuel which is at liquid-fuel rail pressure in liquid-fuel accumulator chamber 322 acts on shoulder 367 to lift liquid-fuel valve needle 364 upwards and away from its seat, allowing liquid fuel to flow through orifices 368. Control valve 325 is electronically actuated, for example by a solenoid that can be energized to lift the control valve needle from its seated (closed) position.

Control valve 329 functions in generally the same way as control valve 325, but control valve 329 is operable to actuate the gaseous-fuel injection valve by controlling the flow of high-pressure liquid fuel from control chamber 332 to drain outlet 350 through passage 356. When control valve 329 is closed, fluid in control chamber 332 is at liquid-fuel rail pressure since fluid is free to flow into control chamber 332 through passage 330 and orifice 331 and the liquid fuel pressure in control chamber 332 exerts a closing force on the gaseous fuel injection valve needle that urges it against the valve seat in nozzle 312. In the illustrated embodiment, liquid-fuel injection valve body 362 also serves as the needle for the gaseous fuel injection valve. When the needle of control valve 329 is lifted, hydraulic fluid drains from control chamber 332 because orifice 331 prevents high-pressure liquid fuel from flowing into control chamber 332 faster than it can flow through drain passage 356; without the assistance of the closing force provided by pressurized fluid in control chamber 332, gaseous-fuel, which is at gaseous-fuel rail pressure in gaseous-fuel accumulator chamber 344 acts on the surface of shoulder 371 to overcome the closing force of spring 370, causing liquid-fuel injection valve body 362 to lift away from its seated position to open the gaseous-fuel injection valve and inject gaseous fuel into the combustion chamber through nozzle orifices 372. Spring 370 biases the needle of the gaseous fuel injection valve in the closed position when the engine is shut down and pressure is relieved from the fuel supply rails.

Gaseous fuel flows into gaseous-fuel accumulator chamber 344 from a gaseous-fuel rail through gaseous-fuel inlet 340 and fuel passage 342. Similar to liquid-fuel inlet 314, gaseous-fuel inlet 340 can be disposed in a recess formed in an annular land, with grooves provided for receiving annular ring seals, which can be resilient o-ring seals. Because the gaseous fuel is stored in gaseous-fuel accumulator chamber 344 at injection pressure, which can be at least 20 MPa (about 3000 psi), and preferably higher, the surfaces of the flat contact face seals are made with a superfine finish. Compared to gasket seals, flat contact face seals have been found to be more durable and effective for sealing high-pressure gas since gasket seals can require higher compressive forces to effect a gas-tight seal and since gasket seals can deteriorate from being subjected to pressure and/or temperature cycling. However, even with flat contact face seals it is possible for high-pressure gaseous fuel to leak from gaseous-fuel accumulator chamber 344 between valve body 310 and nozzle 312, and if high-pressure gaseous fuel accumulates between the cylinder head and valve body 310, it can exert forces against the clamp or other device that holds valve body 310 in its installed position. To prevent the accumulation of high-pressure gaseous fuel between valve body 310 and the cylinder head, valve assembly 300 comprises drain passage 360 to collect gaseous fuel that leaks from gaseous-fuel accumulator chamber 344, and direct it to the drain rail via drain outlet 350.

As described above in the description of integrated valve assembly 300, drain outlet 350 collects liquid fuel that is employed as hydraulic actuation fluid from control chamber 328 via drain passage 352, from control chamber 332 via drain passage 356, and gaseous fuel that leaks from gaseous-fuel accumulator chamber 344 via drain passage 360. Liquid fuel that leaks through the gap between liquid-fuel injection valve body 362 and valve body 310 can also flow into one of drain passages 352 or 356 or into gaseous-fuel accumulator chamber 344, since pressure in the liquid-fuel rail is preferably maintained at a higher pressure than the pressure in the gaseous-fuel rail. Liquid fuel that leaks into gaseous-fuel accumulator chamber 344 is simply injected into the combustion chamber together with the gaseous fuel, however, it is, of course desirable to reduce the amount of liquid fuel that leaks into the gaseous fuel, and this can be achieved by reducing the gap between liquid-fuel injection body 362 and valve body 310 by using a match fit, and by keeping the pressure differential small between the liquid fuel and the gaseous fuel. Drain outlet 350, like inlets 314 and 340, can be disposed in a recess provided in an annular land, wherein the recess provides an annular channel through which a drain rail that comprises a bore in a cylinder head can be connected from one fuel injection valve assembly to the next. Like the fuel inlets, annular seals disposed in grooves in the land area can be employed to seal around drain outlet 350.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. An apparatus for separately delivering a liquid fuel and a gaseous fuel into a combustion chamber of an internal combustion engine, said apparatus comprising:
a liquid-fuel supply system comprising:
a liquid-fuel storage vessel that is fillable with said liquid fuel;
a liquid-fuel pump with a liquid-fuel inlet fluidly connected by a liquid-fuel passage to said liquid-fuel storage vessel;
a liquid-fuel rail fluidly connected to an outlet of said liquid-fuel pump and to a liquid-fuel accumulator chamber inside at least one liquid-fuel injection valve that is operable to introduce said liquid fuel from said liquid-fuel accumulator chamber through a first nozzle directly into said combustion chamber;
a gaseous-fuel supply system comprising:
a gaseous-fuel supply pipe;
a gaseous-fuel pressurizing device with a gaseous-fuel inlet fluidly connected by a gaseous-fuel passage to said gaseous-fuel supply pipe;
a gaseous-fuel rail fluidly connected to an outlet of said gaseous-fuel pressurizing device and to a gaseous-fuel accumulator chamber inside at least one gaseous-fuel injection valve that is operable to introduce said gaseous fuel from said gaseous-fuel accumulator chamber through a second nozzle directly into said combustion chamber; and
a drain rail with a receiving end fluidly connected to at least one drain passage from said liquid-fuel injection valve and at least one drain passage from said gaseous-fuel injection valve, and a discharge end fluidly connected to said liquid-fuel storage vessel, and a venting device through which said gaseous fuel is ventable from at least one of said drain rail and said liquid-fuel storage vessel.

2. The apparatus of claim 1 wherein said gaseous-fuel injection valve comprises a body with a drain passage with an opening to the outside of said body to recover gaseous fuel that leaks from said body and to direct said gaseous fuel through said drain passage to said drain rail.

3. The apparatus of claim 1 wherein said gaseous-fuel injection valve comprises a body and a nozzle with a flat contact face seal between said body and said nozzle.

4. The apparatus of claim 1 wherein said gaseous-fuel supply system further comprises a gaseous-fuel storage vessel that communicates with said gaseous-fuel supply pipe and that is ifilable with said gaseous fuel.

5. The apparatus of claim 4 wherein said gaseous-fuel storage vessel is a thermally insulated vessel in which a liquefied gaseous fuel is storable at cryogenic temperatures, and said gaseous-fuel pressurizing device is a pump for pumping said liquefied gaseous fuel at cryogenic temperatures.

6. The apparatus of claim 5 further comprising a heat exchanger disposed between said pump and said gaseous-fuel rail for heating said gaseous fuel after it is discharged from said pump.

7. The apparatus of claim 4 wherein said gaseous-fuel storage vessel is a pressure vessel in which said gaseous fuel is storable under pressure and said gaseous-fuel pressurizing device is a compressor.

8. The apparatus of claim 7 further comprising a heat exchanger disposed between said compressor and said gaseous-fuel rail for cooling said gaseous fuel after it is discharged from said compressor.

9. The apparatus of claim 1 wherein a portion of said liquid-fuel rail comprises a bore disposed within a cylinder head of said internal combustion engine.

10. The apparatus of claim 9 wherein said engine has a plurality of cylinder heads with each one of said plurality of cylinder heads being associated with a plurality of in-line cylinders and said liquid-fuel rail comprises a bore through one of said plurality of cylinder heads for delivering said liquid fuel to a plurality of liquid-fuel injection valves that are associated with said at least one of said plurality of cylinder heads.

11. The apparatus of claim 1 wherein a portion of said gaseous-fuel rail comprises a bore disposed within a cylinder head of said internal combustion engine.

12. The apparatus of claim 11 wherein said engine has a plurality of cylinder heads with each one of said plurality of cylinder heads being associated with a plurality of in-line cylinders and said gaseous-fuel rail comprises a bore through one of said plurality of cylinder heads for delivering said gaseous fuel to a plurality of gaseous-fuel injection valves that are associated with said at least one of said plurality of cylinder heads.

13. The apparatus of claim 1 wherein a portion of said drain rail comprises a bore disposed within a cylinder head of said internal combustion engine.

14. The apparatus of claim 13 wherein said engine has a plurality of cylinder heads with each one of said plurality of cylinder heads being associated with a plurality of in-line cylinders and said drain rail comprises a bore through one of said plurality of cylinder heads for collecting fluid from drain ports associated with a plurality of liquid-fuel injection valves and a plurality of gaseous-fuel injection valves.

15. The apparatus of claim 1 wherein said liquid-fuel rail comprises at least one bore through a cylinder head of said engine that communicates with a plurality of liquid-fuel injection valves; said gaseous-fuel rail comprises at least one bore through said cylinder head that communicates with a plurality of gaseous-fuel injection valves; and said drain rail comprises at least one bore through said cylinder head that communicates with said plurality of liquid-fuel injection valves and said plurality of gaseous-fuel injection valves.

16. The apparatus of claim 1 wherein said venting device comprises a pressure relief valve.

17. The apparatus of claim 16 wherein said pressure relief valve is mounted to vent gas from a vapor space of said liquid-fuel storage vessel.

18. The apparatus of claim 1 wherein said venting device comprises a roll-over vent valve mounted on top of said liquid-fuel storage vessel.

19. The apparatus of claim 1 further comprising a vent pipe connecting said venting device to said gaseous-fuel supply pipe.

20. The apparatus of claim 1 further comprising a vent pipe connecting said venting device to a holding tank.

21. The apparatus of claim 1 wherein said venting device comprises a gas-liquid separator with a liquid outlet communicating with said liquid-fuel storage vessel and a gas outlet communicating with a vent pipe.

22. The apparatus of claim 1 wherein said liquid-fuel injection valve and said gaseous-fuel injection valve are housed within one valve body.

23. The apparatus of claim 22 wherein said liquid-fuel injection valve and said gaseous-fuel injection valve are co-axial with said liquid-fuel injection valve at the centre and said gaseous-fuel injection valve disposed in an annular space around said liquid-fuel injection valve.

24. The apparatus of claim 23 wherein said liquid-fuel injection valve comprises a nozzle that is movable to function as the needle for said gaseous-fuel injection valve.

25. The apparatus of claim 1 wherein said liquid-fuel injection valve comprises a valve needle that is spring biased and hydraulically actuated by manipulating hydraulic fluid pressure within a first control chamber between two pressures.

26. The apparatus of claim 25 wherein said first control chamber is fluidly connectable by fluid passages with said drain rail and said liquid-fuel rail, and a control valve associated with at least one of said fluid passages, is operable to switch hydraulic fluid pressure between liquid-fuel rail pressure and drain rail pressure.

27. The apparatus of claim 1 wherein gaseous-fuel injection valve comprises a valve needle that is spring biased and hydraulically actuated by manipulating hydraulic fluid pressure within a second control chamber between two pressures.

28. The apparatus of claim 27 wherein said second control chamber is fluidly connectable by fluid passages with said drain rail and said liquid-fuel rail, and a control valve associated with at least one of said fluid passages, is operable to switch hydraulic fluid pressure between liquid-fuel rail pressure and drain rail pressure.

29. A method of separately delivering a liquid fuel and a gaseous fuel into a combustion chamber of an internal combustion engine, said method comprising:
supplying a liquid fuel from a liquid-fuel storage vessel;
pumping said liquid fuel and delivering said liquid fuel at injection pressure from said liquid-fuel storage vessel to a liquid-fuel injection valve through a liquid-fuel rail;
actuating said liquid-fuel injection valve to introduce said liquid fuel directly into said combustion chamber;
supplying a gaseous fuel from a gaseous-fuel supply pipe;
pressurizing said gaseous fuel and delivering said gaseous fuel at injection pressure from said gaseous-fuel supply pipe to a gaseous-fuel injection valve through a gaseous-fuel rail;
actuating said gaseous-fuel injection valve to introduce said gaseous fuel directly into said combustion chamber;
collecting in a drain rail liquid fuel and gaseous fuel from said liquid-fuel injection valve and said gaseous-fuel injection valve, respectively, and directing liquid fuel from said drain rail to said liquid-fuel storage vessel, and directing gaseous fuel from said drain rail to a vent pipe.

30. The method of claim 29 further comprising supplying said gaseous fuel to said gaseous-fuel supply pipe from a gaseous-fuel storage vessel.

31. The method of claim 29 further comprising venting gaseous fuel through said vent pipe when gas pressure exceeds a predetermined set point.

32. The method of claim 31 further comprising directing said gaseous fuel from said vent pipe to a holding tank.

33. The method of claim 31 further comprising directing said gaseous fuel from said vent pipe to said gaseous fuel supply pipe.

34. The method of claim 29 further comprising maintaining pressure within said liquid-fuel storage vessel at or near atmospheric pressure by connecting said vent pipe to said liquid-fuel storage vessel.

35. The method of claim 34 further comprising preventing liquid fuel from escaping through said vent line by blocking fluid flow through said vent pipe if said liquid-fuel storage vessel tips onto its side or up-side-down.

36. The method of claim 29 further comprising directing at least one of said liquid fuel and said gaseous fuel through a bore in a cylinder head of said engine that is at least a portion of a respective one of said liquid-fuel rail, said gaseous-fuel rail, and said drain rail.

37. The method of claim of claim 29 wherein each one of said liquid-fuel rail, said gaseous-fuel rail, and said drain rail comprises at least a portion that is a bore provided within a cylinder head of said engine.

38. The method of claim 29 further comprising hydraulically actuating at least one of said liquid-fuel injection valve and said gaseous-fuel injection valve by controlling liquid-fuel pressure in a control chamber associated with a plunger that is associated with a fuel injection valve needle.

39. The method of claim 38 further comprising supplying high pressure liquid fuel to said control chamber from said liquid-fuel rail, draining liquid fuel from said control chamber to said drain rail, and operating a control valve to switch liquid-fuel pressure inside said control chamber between liquid-fuel rail pressure and drain rail pressure, wherein drain rail pressure is lower than liquid-fuel rail pressure.

* * * * *